United States Patent [19]

Kresge et al.

[11] Patent Number: 5,300,277

[45] Date of Patent: * Apr. 5, 1994

[54] SYNTHESIS OF MESOPOROUS CRYSTALLINE MATERIAL

[75] Inventors: Charles T. Kresge, West Chester, Pa.; Wielsaw J. Roth, Sewell, N.J.

[73] Assignee: Mobil Oil Corporation, Fairfax, Va.

[*] Notice: The portion of the term of this patent subsequent to Oct. 15, 2008 has been disclaimed.

[21] Appl. No.: 964,235

[22] Filed: Oct. 21, 1992

Related U.S. Application Data

[63] Continuation-in-part of Ser. No. 734,825, Jul. 24, 1991, Pat. No. 5,198,203, which is a continuation-in-part of Ser. No. 470,008, Jan. 25, 1990, Pat. No. 5,102,643.

[51] Int. Cl.$^5$ .................. C01B 33/20; C01B 33/26
[52] U.S. Cl. .................. 423/703; 423/328.2; 423/329.1; 423/705; 502/64
[58] Field of Search .............. 423/700, 705, 709, 706, 423/712; 502/60, 62

[56] References Cited

U.S. PATENT DOCUMENTS

| | | | |
|---|---|---|---|
| 3,414,602 | 12/1968 | Acara | 260/448 |
| 3,567,372 | 3/1971 | Duecker et al. | 23/111 |
| 3,884,835 | 5/1975 | Vaughan | 252/451 |
| 4,091,079 | 5/1978 | Vaughan | 423/328 |
| 4,176,090 | 11/1979 | Vaughan et al. | 252/455 Z |
| 4,216,188 | 8/1980 | Shabria et al. | 423/118 |
| 4,248,739 | 2/1981 | Vaughan et al. | 252/455 R |
| 4,310,440 | 1/1982 | Wilson et al. | 252/435 |
| 4,367,163 | 1/1983 | Pinnavaia et al. | 252/455 R |
| 4,385,994 | 5/1983 | Wilson et al. | 210/689 |
| 4,440,871 | 4/1984 | Lok et al. | 502/214 |
| 4,481,177 | 11/1984 | Valyocsik | 423/329 |
| 4,578,258 | 3/1986 | Rieck | 423/325 |
| 4,582,693 | 4/1986 | Desmond et al. | 423/329 |
| 4,626,421 | 12/1986 | Zones | 423/326 |
| 4,632,815 | 12/1986 | Valyocsik | 423/328 |
| 4,640,829 | 2/1987 | Rubin | 423/328 |
| 4,650,655 | 3/1987 | Chu et al. | 423/328 |
| 4,661,332 | 4/1987 | Vaughan et al. | 423/326 |
| 4,673,559 | 6/1987 | Derouane et al. | 423/306 |
| 4,791,088 | 12/1988 | Chu et al. | 502/232 |
| 4,793,333 | 12/1988 | Lok et al. | 55/33 |
| 4,803,060 | 2/1989 | Occelli | 423/326 |
| 4,826,667 | 5/1989 | Zones et al. | 423/277 |
| 4,831,006 | 5/1989 | Aufdembrink | 502/242 |
| 4,859,648 | 8/1989 | Landis et al. | 502/242 |
| 4,880,611 | 11/1989 | von Ballmoos et al. | 423/306 |
| 4,954,325 | 9/1990 | Rubin et al. | 423/328 |
| 5,057,296 | 10/1991 | Beck | 423/277 |
| 5,102,643 | 4/1992 | Kresge et al. | 423/328 |
| 5,108,725 | 4/1992 | Beck et al. | 423/705 |
| 5,112,589 | 5/1992 | Johnson et al. | 423/705 |
| 5,156,828 | 10/1992 | Pegnen et al. | 423/709 |
| 5,211,934 | 5/1993 | Kresge et al. | 423/706 |
| 5,215,737 | 6/1993 | Chu et al. | 423/712 |

OTHER PUBLICATIONS

Eugster, H. P., "Hydrous Sodium Silicates from Lake Magadi, Kenya: Precursors of Bedded Chert," Science, vol. 157, pp. 1177–1180 (1967).

d'Yvoire, F., "Memoir: Study of Aluminum Phosphate and Trivalent Iron," pp. 1762–1776.

Moore, P. B. et al., "An X-ray Structural Study of Cacoxenite, a Mineral Phosphate," Nature, v. 306, No. 5941, pp. 356–358 (1983).

Kirk-Othmer Encyclopedia of Chemical Technology, 3rd ed., v. 20, pp. 766–781.

Szostak, R., et al., "Ultralarge Pore Molecular Sieves: Characterization of the 14 Angstroms Pore Mineral, Cacoxenite," Zeolites: Facts, Figures and Future, Elseview Sc. Pub., BV. (1989).

*Primary Examiner*—Anthony McFarlane
*Attorney, Agent, or Firm*—Alexander J. McKillop; Malcolm D. Keen; Dennis P. Santini

[57] ABSTRACT

This invention relates to an improvement in the method for synthesis of a new synthetic composition of porous crystalline material. The new crystalline material exhibits a large sorption capacity demonstrated by its benzene adsorption capacity of greater than about 10 grams benzene/100 grams at 50 torr and 25° C. and a particular, unique X-ray diffraction pattern.

21 Claims, No Drawings

SYNTHESIS OF MESOPOROUS CRYSTALLINE MATERIAL

CROSS-REFERENCE TO RELATED APPLICATIONS

This application is a continuation-in-part of U.S. patent application Ser. No. 07/734,825, filed Jul. 24, 1991, now U.S. Pat. No. 5,198,203, which is a continuation-in-part of U.S. patent application Ser. No. 07/470,008, filed Jan. 25, 1990, now U.S. Pat. No. 5,102,643.

BACKGROUND OF THE INVENTION

1. Field of the Invention

This invention relates to an improved synthesis method for preparing a novel composition of synthetic ultra-large pore crystalline material which can be used as a sorbent or a catalyst component.

2. Description of the Prior Art

Porous inorganic solids have found great utility as catalysts and separations media for industrial application. The openness of their microstructure allows molecules access to the relatively large surface areas of these materials that enhance their catalytic and sorptive activity. The porous materials in use today can be sorted into three broad categories using the details of their microstructure as a basis for classification. These categories are the amorphous and paracrystalline supports, the crystalline molecular sieves and modified layered materials. The detailed differences in the microstructures of these materials manifest themselves as important differences in the catalytic and sorptive behavior of the materials, as well as in differences in various observable properties used to characterize them, such as their surface area, the sizes of pores and the variability in those sizes, the presence or absence of X-ray diffraction patterns and the details in such patterns, and the appearance of the materials when their microstructure is studied by transmission electron microscopy and electron diffraction methods.

Amorphous and paracrystalline materials represent an important class of porous inorganic solids that have been used for many years in industrial applications. Typical examples of these materials are the amorphous silicas commonly used in catalyst formulations and the paracrystalline transitional aluminas used as solid acid catalysts and petroleum reforming catalyst supports. The term "amorphous" is used here to indicate a material with no long range order and can be somewhat misleading, since almost all materials are ordered to some degree, at least on the local scale. An alternate term that has been used to describe these materials is "X-ray indifferent". The microstructure of the silicas consists of 100–250 Angstrom particles of dense amorphous silica (*Kirk-Othmer Encyclopedia of Chemical Technology*, 3rd ed., 20, 766–781 (1982)), with the porosity resulting from voids between the particles. Since there is no long range order in these materials, the pores tend to be distributed over a rather large range. This lack of order also manifests itself in the X-ray diffraction pattern, which is usually featureless.

Paracrystalline materials such as the transitional aluminas also have a wide distribution of pore sizes, but better defined X-ray diffraction patterns usually consisting of a few broad peaks. The microstructure of these materials consists of tiny crystalline regions of condensed alumina phases and the porosity of the materials results from irregular voids between these regions ( K. Wefers and Chanakya Misra, "Oxides and Hydroxides of Aluminum", Technical Paper No. 19 Revised, Alcoa Research Laboratories, 54–59 (1987)). Since, in the case of either material, there is no long range order controlling the sizes of pores in the material, the variability in pore size is typically quite high. The sizes of pores in these materials fall into a regime called the mesoporous range, which, for the purposes of this application, is from about 13 to 200 Angstroms.

In sharp contrast to these structurally ill-defined solids are materials whose pore size distribution is very narrow because it is controlled by the precisely repeating crystalline nature of the materials' microstructure. These materials are called "molecular sieves", the most important examples of which are zeolites.

Zeolites, both natural and synthetic, have been demonstrated in the past to have catalytic properties for various types of hydrocarbon conversion. Certain zeolitic materials are ordered, porous crystalline aluminosilicates having a definite crystalline structure as determined by X-ray diffraction, within which there are a large number of smaller cavities which may be interconnected by a number of still smaller channels or pores. These cavities and pores are uniform in size within a specific zeolitic material. Since the dimensions of these pores are such as to accept for adsorption molecules of certain dimensions while rejecting those of larger dimensions, these materials are known as "molecular sieves" and are utilized in a variety of ways to take advantage of these properties.

Such molecular sieves, both natural and synthetic, include a wide variety of positive ion-containing crystalline silicates. These silicates can be described as a rigid three-dimensional framework of $SiO_4$ and Periodic Table Group IIIB element oxide, e.g., $AlO_4$, in which the tetrahedra are cross-linked by the sharing of oxygen atoms whereby the ratio of the total Group IIIB element, e.g., aluminum, and Group IVB element, e.g., silicon, atoms to oxygen atoms is 1:2. The electrovalence of the tetrahedra containing the Group IIIB element, e.g., aluminum, is balanced by the inclusion in the crystal of a cation, for example, an alkali metal or an alkaline earth metal cation. This can be expressed wherein the ratio of the Group IIIB element, e.g., aluminum, to the number of various cations, such as Ca/2, Sr/2, Na, K or Li, is equal to unity. One type of cation may be exchanged either entirely or partially with another type of cation utilizing ion exchange techniques in a conventional manner. By means of such cation exchange, it has been possible to vary the properties of a given silicate by suitable selection of the cation. The spaces between the tetrahedra are occupied by molecules of water prior to dehydration.

Prior art techniques have resulted in the formation of a great variety of synthetic zeolites. Many of these zeolites have come to be designated by letter or other convenient symbols, as illustrated by zeolite A (U.S. Pat. No. 2,882,243); zeolite X (U.S. Pat. No. 2,882,244); zeolite Y (U.S. Pat. No. 3,130,007); zeolite ZK-5 (U.S. Pat. No. 3,247,195); zeolite ZK-4 (U.S. Pat. No. 3,314,752); zeolite ZSM-5 (U.S. Pat. No. 3,702,886); zeolite ZSM-11 (U.S. Pat. No. 3,709,979); zeolite ZSM-12 (U.S. Pat. No. 3,832,449); zeolite ZSM-20 (U.S. Pat. No. 3,972,983); ZSM-35 (U.S. Pat. No. 4,016,245): and zeolite ZSM-23 (U.S. Pat. No. 4,076,842), merely to name a few.

The SiO$_2$/Al$_2$O$_3$ ratio of a given zeolite is often variable. For example, zeolite X can be synthesized with SiO$_2$/Al$_2$O$_3$ ratios of from 2 to 3; zeolite Y, from 3 to about 6. In some zeolites, the upper limit of the SiO$_2$/Al$_2$O$_3$ ratio is unbounded. ZSM-5 is one such example wherein the SiO$_2$/Al$_2$O$_3$ ratio is at least 5 and up to the limits of present analytical measurement techniques. U.S. Pat. No. 3,941,871 (Re. 29,948) discloses a porous crystalline silicate made from a reaction mixture containing no deliberately added alumina in the recipe and exhibiting the X-ray diffraction tern characteristic of ZSM-5. U.S. Pat. Nos. 4,061,724; 4,073,865 and 4,104,294 describe crystalline silicate of varying alumina and metal content.

Aluminum phosphates are taught in U.S. Pat. Nos. 4,310,440 and 4,385,994, for example. These aluminum phosphate materials have essentially electroneutral lattices. U.S. Pat. No. 3,801,704 teaches an aluminum phosphate treated in a certain way to impart acidity.

An early reference to a hydrated aluminum phosphate which is crystalline until heated at about 110° C., at which point it becomes amorphous or transforms, is the "H$_1$" phase or hydrate of aluminum phosphate of F. d'Yvoire, *Memoir Presented to the Chemical Society, No. 392*, "Study of Aluminum Phosphate and Trivalent Iron", Jul. 6, 1961 (received), 1762–1776. This material, when crystalline, is identified by the JCPDS International Center for Diffraction Data card number 15-274. Once heated at about 110° C., however, the d'Yvoire material becomes amorphous or transforms to the aluminophosphate form of tridymite.

Compositions comprising crystals having a framework topology after heating at 110° C. or higher giving an X-ray diffraction pattern consistent with a material having pore windows formed by 18 tetrahedral members of about 12-13 Angstroms in diameter are taught in U.S. Pat. No. 4,880,611.

A naturally occurring, highly hydrated basic ferric oxyphosphate mineral, cacoxenite, is reported by Moore and Shen, *Nature*, 306, No. 5941, 356–358 (1983) to have a framework structure containing very large channels with a calculated free pore diameter of 14.2 Angstroms. R. Szostak et al., *Zeolites: Facts, Figures, Future*, Elsevier Science Publishers B. V. (1989), present work showing cacoxenite as being very hydrophilic, i.e., adsorbing non-polar hydrocarbons only with great difficulty. Their work also shows that thermal treatment of cacoxenite causes an overall decline in X-ray peak intensity.

Silicoaluminophosphates of various structures are taught in U.S. Pat. No. 4,440,871. Aluminosilicates containing phosphorous, i.e., silicoaluminophosphates of particular structures are taught in U.S. Pat. No. 3,355,246 (i.e., ZK-21) and U.S. Pat. No. 3,791,964 (i.e., ZK-22) Other teachings of silicoaluminophosphates and their synthesis include U.S. Pat. No. 4,673,559 (two-phase synthesis method); U.S. Pat. No. 4,623,527 (MCM-10); U.S. Pat. No. 4,639,358 (MCM-1); U.S. Pat. No. 4,647,442 (MCM-2); U.S. Pat. No. 4,664,897 (MCM-4); U.S..Pat. No. 4,638,357 (MCM-5); and U.S. Pat. No. 4,632,811 (MCM-3).

A method for synthesizing crystalline metalloaluminophosphates is shown in U.S. Pat. No. 4,713,227, and an antimonophosphoaluminate and the method for its synthesis are taught in U.S. Pat. No. 4,619,818. U.S. Pat. No. 4,567,029 teaches metalloaluminophosphates, and titaniumaluminophosphate and the method for its synthesis are taught in U.S. Pat. No. 4,500,651.

The phosphorus-substituted zeolites of Canadian Patents 911,416; 911,417; and 911,418 are referred to as "aluminosilicophosphate" zeolites. Some of the phosphorus therein appears to be occluded, not structural.

U.S. Pat. No. 4,363,748 describes a combination of silica and aluminum-calcium-cerium phosphate as a low acid activity catalyst for oxidative dehydrogenation. Great Britain Patent 2,068,253 discloses a combination of silica and aluminum-calcium-tungsten phosphate as a low acid activity catalyst for oxidative dehydrogenation. U.S. Pat. No. 4,228,036 teaches an alumina-aluminum phosphate-silica matrix as an amorphous body to be mixed with zeolite for use as cracking catalyst. U.S. Pat. No. 3,213,035 teaches improving hardness of aluminosilicate catalysts by treatment with phosphoric acid. The catalysts are amorphous.

Other patents teaching aluminum phosphates include U.S. Pat. Nos. 4,365,095; 4,361,705; 4,222,896; 4,210,560; 4,179,358; 4,158,621; 4,071,471; 4,014,945; 3,904,550; and 3,697,550.

The precise crystalline microstructure of most zeolites manifests itself in a well-defined X-ray diffraction pattern that usually contains many sharp maxima and that serves to uniquely define the material. Similarly, the dimensions of pores in these materials are very regular, due to the precise repetition of the crystalline microstructure. All molecular sieves discovered to date have pore sizes in the microporous range, which is usually quoted as 2 to 20 Angstroms.

In layered materials, the interatomic bonding in two directions of the crystalline lattice is substantially different from that in the third direction, resulting in a structure that contains cohesive units resembling sheets. Usually, the bonding between the atoms within these sheets is highly covalent, while adjacent layers are held together by ionic forces or van der Waals interactions. These latter forces can frequently be neutralized by relatively modest chemical means, while the bonding between atoms within the layers remains intact and unaffected.

Certain layered materials, which contain layers capable of being spaced apart with a swelling agent, may be pillared to provide materials having a large degree of porosity. Examples of such layered materials include clays. Such clays may be swollen with water, whereby the layers of the clay are spaced apart by water molecules. Other layered materials are not swellable with water, but may be swollen with certain organic swelling agents such as amines and quaternary ammonium compounds. Examples of such non-water swellable layered materials are described in U.S. Pat. No. 4,859,648 and include layered silicates, magadiite, kenyaite, tritita- nates and perovskites. Another example of a non-water swellable layered material, which can be swollen with certain organic swelling agents, is a vacancy-containing titanometallate material, as described in U.S. Pat. No. 4,831,006.

Once a layered material is swollen, the material may be pillared by interposing a thermally stable substance, such as silica, between the spaced apart layers. The aforementioned U.S. Pat. Nos. 4,831,006 and 4,859,648 describe methods for pillaring the non-water swellable layered materials described therein and are incorporated herein by reference for definition of pillaring and pillared materials.

Other patents teaching pillaring of layered materials and the pillared products include U.S. Pat. Nos. 4,216,188; 4,248,739; 4,176,090; and 4,367,163; and European Patent Application 205,711.

The X-ray diffraction patterns of pillared layered materials can vary considerably, depending on the degree that swelling and pillaring disrupt the otherwise usually well-ordered layered microstructure. The regularity of the microstructure in some pillared layered materials is so badly disrupted that only one peak in the low angle region on the X-ray diffraction pattern is observed, as a d-spacing corresponding to the interlayer repeat in the pillared material. Less disrupted materials may show several peaks in this region that are generally orders of this fundamental repeat. X-ray reflections from the crystalline structure of the layers are also sometimes observed. The pore size distribution in these pillared layered materials is narrower than those in amorphous and paracrystalline materials but broader than that in crystalline framework materials.

Applicants know of no prior art teaching the presently claimed improved method for synthesizing the synthetic ultra-large pore non-layered crystalline material herein described.

SUMMARY OF THE INVENTION

The present invention is directed to an improved method for synthesizing a novel synthetic composition of matter comprising an ultra-large pore crystalline material. The method provides a high purity, reproducible product in a low-cost procedure compatible with normally used crystal synthesis equipment. The crystalline material prepared hereby is an inorganic, porous, non-layered phase which may have uniformly sized pores with a pore dimension of at least about 13 Angstroms, and within the range of from about 13, e.g., 15, Angstroms to about 200 Angstroms as measured by argon physisorption. This novel crystalline composition exhibits an X-ray diffraction pattern and a benzene adsorption capacity usually greater than about 10 grams benzene/100 grams crystal at 50 torr and 25° C.

DESCRIPTION OF SPECIFIC EMBODIMENTS

U.S. patent application Ser. No. 07/734,825 is entirely incorporated herein by reference.

As demonstrated hereinafter, the inorganic, non-layered mesoporous crystalline material prepared in accordance with this invention has the following composition:

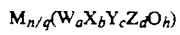

wherein W is a divalent element, such as a divalent first row transition metal, e.g., manganese, cobalt and iron, and/or magnesium, preferably cobalt; X is a trivalent element, such as aluminum, boron, iron and/or gallium, preferably aluminum; Y is a tetravalent element or mixture of elements comprising silicon; Z is a pentavalent element, such as phosphorus; M is one or more ions, such as, for example, ammonium, Group IA, IIA and VIIB ions, usually hydrogen, sodium and/or fluoride ions; n is the charge of the composition excluding M expressed as oxides; q is the weighted molar average valence of M; n/q is the number of moles or mole fraction of M; a, b, c, and d are mole fractions of W, X, Y and Z, respectively; h is a number of from 1 to 2.5; and $(a+b+c+d)=1$.

A preferred embodiment of the above crystalline material is when $(a+b+c)$ is greater than d, and $h=2$. A further embodiment is when a and $d=0$, and $h=2$.

In the as-synthesized form, the material of this invention has a composition, on an anhydrous basis, expressed empirically as follows:

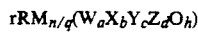

wherein R is the total organic material not included in M as an ion, and r is the coefficient for R, i.e., the number of moles or mole fraction of R.

The M and R components are associated with the material as a result of their presence during crystallization, and are easily removed or, in the case of M, replaced by post-crystallization methods hereinafter more particularly described.

To the extent desired, the original M, e.g., sodium or chloride, ions of the as-synthesized material prepared hereby can be replaced in accordance with techniques well known in the art, at least in part, by ion exchange with other ions. Preferred replacing ions include metal ions, hydrogen ions, hydrogen precursor, e.g., ammonium, ions and mixtures thereof. Particularly preferred ions are those which tailor the catalytic activity for certain hydrocarbon conversion reactions. These include hydrogen, rare earth metals and metals of Groups IA (e.g., K), IIA (e.g., Ca), VIIA (e.g., Mn), VIIIA (e.g., Ni),IB (e.g., Cu), IIB (e.g., Zn), IIIB (e.g., In), IVB (e.g., Sn), and VIIB (e.g., F) of the Periodic Table of the Elements (Sargent-Welch Scientific Co. Cat. No. S-18806, 1979) and mixtures thereof.

The crystalline (i.e., meant here as having sufficient order to provide a diffraction pattern such as, for example, by X-ray, electron or neutron diffraction, following calcination with at least one peak) mesoporous material prepared hereby may be characterized by its novel structure, including extremely large pore windows, and high sorption capacity. The term "mesoporous" is used here to indicate crystals having pores within the range of from about 13, e.g., from about 15, Angstroms to about 200 Angstroms in diameter. The materials of this invention may have uniform pores within the range of from about 13 Angstroms to about 200 Angstroms, more usually from about 15 Angstroms to about 100 Angstroms in diameter. For the purposes of this application, a working definition of "porous" is a material that adsorbs at least 1 gram of a small molecule, such as Ar, $N_2$, n-hexane, benzene or cyclohexane, per 100 grams of the solid.

The material synthesized by the present invention can be distinguished from other porous inorganic solids by the regularity of its large open pores, whose pore size more nearly resembles that of amorphous or paracrystalline materials, but whose regular arrangement and uniformity of size (pore size distribution within a single phase of, for example, ±25%, usually ±15% or less of the average pore size of that phase) resemble more those of crystalline framework materials such as zeolites. The material appears to have a regular arrangement of large open pores that can be synthesized with open internal dimensions from about 13 Angstroms to about 200 Angstroms.

The most regular preparations of the materials synthesized by the present invention following removal of organic, e.g., by calcination at 540° C. in air for at least about 1 hour, give an X-ray diffraction pattern with distinct maxima in the extreme low angle region. The positions of these peaks will vary somewhat with changes in the pore diameters of the materials but the ratios of d-spacings of those peaks will remain fixed. Using $d_1$ to indicate the d-spacings of the strongest peak in the X-ray diffraction pattern (relative intensity=100), the X-ray diffraction pattern of the calcined material of the present invention exhibits $d_1$ at a position greater than about 18 Angstroms d-spacing and at least one additional weaker peak with d-spacing $d_2$ such that the ratios of these d-spacings relative to $d_1$ (i.e., $d_n/d_1$) correspond to the ranges give in Table 1.

TABLE 1

| d-Spacing, $d_n$, Angstroms | $d_n/d_1$ | Relative Intensity |
|---|---|---|
| $d_1, \gtrsim \sim 18$ | 1.0 | 100 |
| $d_2$ | 0.87 ± 0.06 | w-m |

More particularly, the X-ray diffraction pattern of the calcined material synthesized hereby includes at least two additional weaker peaks at d-spacings $d_2$ and $d_3$ such that the ratios of these d-spacings relative to the strongest peak $d_1$ (at a position greater than about 18 Angstroms d-spacing) correspond to the ranges given in Table 2.

TABLE 2

| d-Spacing, $d_n$, Angstroms | $d_n/d_1$ | Relative Intensity |
|---|---|---|
| $d_1, \gtrsim \sim 18$ | 0.1 | 100 |
| $d_2$ | 0.87 ± 0.06 | w-m |
| $d_3$ | 0.52 ± 0.04 | w |

Still more particularly, the X-ray diffraction pattern of the calcined product material of the present invention includes at least four additional weaker peaks at d-spacings $d_2$, $d_3$, $d_4$ and $d_5$ such that the ratios of these d-spacings relative to the strongest peak $d_1$ (at a position greater than about 18 Angstroms d-spacing) correspond to the ranges given in Table 3.

TABLE 3

| d-Spacing, $d_n$, Angstroms | $d_n/d_1$ | Relative Intensity |
|---|---|---|
| $d_1, \gtrsim \sim 18$ | 1.0 | 100 |
| $d_2$ | 0.87 ± 0.06 | w-m |
| $d_3$ | 0.55 ± 0.02 | w |
| $d_4$ | 0.52 ± 0.01 | w |
| $d_5$ | 0.50 ± 0.01 | w |

For the calcined products of examples presented herein, the X-ray diffraction patterns can be characterized as including at least two peaks at positions corresponding to the ranges given in Table 4.

TABLE 4

| d-Spacing, Angstroms | Relative Intensity |
|---|---|
| 33.0 ± 2.0 | 100 |
| 28.7 ± 1.5 | w |

More particularly, the X-ray diffraction patterns of the calcined products of examples presented herein can be characterized as including at least three peaks at positions corresponding to the ranges given in Table 5.

TABLE 5

| d-Spacing, Angstroms | Relative Intensity |
|---|---|
| 33.0 ± 2.0 | 100 |
| 28.7 ± 1.5 | w |

TABLE 5-continued

| | |
|---|---|
| 17.2 ± 1.2 | w |

Still more particularly, the X-ray diffraction patterns of some calcined products of examples presented herein can be characterized as including at least five peaks at positions corresponding to the ranges given in Table 6.

TABLE 6

| d-Spacing, Angstroms | Relative Intensity |
|---|---|
| 33.0 ± 2.0 | 100 |
| 28.7 ± 1.5 | w |
| 18.2 ± 0.5 | w |
| 17.2 ± 0.4 | w |
| 16.5 ± 0.3 | w |

In its calcined form, the crystalline material product of the invention may be further characterized by an equilibrium benzene adsorption capacity usually greater than about 10 grams benzene/100 grams crystal at 50 torr and 25° C. (basis: crystal material having been treated in an attempt to insure no pore blockage by incidental contaminants, if necessary).

The equilibrium benzene adsorption capacity characteristic of this material is measured on the basis of no pore blockage by incidental contaminants. For instance, the sorption test will be conducted on the crystalline material phase having any pore blockage contaminants and water removed by ordinary methods. Water may be removed by dehydration techniques, e.g., thermal treatment. Pore blocking inorganic amorphous materials, e.g., silica, and organics may be removed by contact with acid or base or other chemical agents such that the detrital material will be removed without detrimental effect on the crystal of the invention.

Still more particularly, the calcined inorganic, non-layered crystalline material product of the invention may be characterized as having a pore size of about 13 Angstroms or greater as measured by physisorption measurements, hereinafter more particularly set forth.

X-ray diffraction data were collected on a Scintag PAD X automated diffraction system employing theta-theta geometry, Cu K-alpha radiation, and an energy dispersive X-ray detector. Use of the energy dispersive X-ray detector eliminated the need for incident or diffracted beam monochromators. Both the incident and diffracted X-ray beams were collimated by double slit incident and diffracted collimation systems. The slit sizes used, starting from the X-ray tube source, were 0.5, 1.0, 0.3 and 0.2 mm, respectively. Different slit systems may produce differing intensities for the peaks. The materials of the present invention that have the largest pore sizes may require more highly collimated incident X-ray beams in order to resolve the low angle peak from the transmitted incident X-ray beam.

The diffraction data were recorded by step-scanning at 0.04 degrees of two-theta, where theta is the Bragg angle, and a counting time of 10 seconds for each step. The interplanar spacings, d's, were calculated in Angstrom units (A), and the relative intensities of the lines, $I/I_o$, where $I_o$ is one-hundredth of the intensity of the strongest line, above background, were derived with the use of a profile fitting routine. Overlap between peaks required the use of deconvolution techniques to determine peak positions in many cases. The intensities were uncorrected for Lorentz and polarization effects.

The relative intensities are given in terms of the symbols vs=very strong (75-100), s=strong (50-74), m=medium (25-49) and w=weak (0-24). It should be understood that diffraction data listed as single lines may consist of multiple overlapping lines which under certain conditions, such as very high experimental resolution or crystallographic changes, may appear as resolved or partially resolved lines. Typically, crystallographic changes can include minor changes in unit cell parameters and/or a change in crystal symmetry, without a substantial change in structure. These minor effects, including changes in relative intensities, can also occur as a result of differences in cation content, framework composition, nature and degree of pore filling, thermal and/or hydrothermal history, and peak width/shape variations due to particle size/shape effects, structural disorder or other factors known to those skilled in the art of X-ray diffraction.

The equilibrium benzene adsorption capacity is determined by contacting the material of the invention, after dehydration or calcination at, for example, about 540° C. for at least about one hour, e.g., about 6 hours, and other treatment, if necessary, in an attempt to remove any pore blocking contaminants, at 25° C. and 50 torr benzene until equilibrium is reached. The weight of benzene sorbed is then determined as more particularly described hereinafter.

When used as a sorbent or catalyst component, the product composition of the invention should be subjected to treatment to remove part or all of any organic constituent. The product composition can also be used as a catalyst component in intimate combination with a hydrogenating component such as tungsten, vanadium, molybdenum, rhenium, nickel, cobalt, chromium, manganese, or a noble metal such as platinum or palladium or mixtures thereof where a hydrogenation-dehydrogenation function is to be performed. Such component can be in the composition by way of co-crystallization, exchanged into the composition to the extent a Group IIIB element, e.g., aluminum, is in the structure, impregnated therein or intimately physically admixed therewith. Such component can be impregnated in or on to it such as, for example, by, in the case of platinum, treating the silicate with a solution containing a platinum metal-containing ion. Thus, suitable platinum compounds for this purpose include chloroplatinic acid, platinous chloride and various compounds containing platinum amine complexes.

The above crystalline material, especially in its metal, hydrogen and ammonium forms can be beneficially converted to another form by thermal treatment (calcination). This thermal treatment is generally performed by heating one of these forms at a temperature of at least 400° C. for at least 1 minute and generally not longer than 20 hours, preferably from about 1 to about 10 hours. While subatmospheric pressure can be employed for the thermal treatment, atmospheric pressure is desired for reasons of convenience, such as in air, nitrogen, ammonia, etc. The thermal treatment can be performed at a temperature up to about 750° C. The thermally treated product is particularly useful in the catalysis of certain hydrocarbon conversion reactions.

The crystalline material product of this invention, when employed either as an adsorbent or as a catalyst component in an organic compound conversion process should be dehydrated, at least partially. This can be done by heating to a temperature in the range of 200° C. to 595° C. in an atmosphere such as air, nitrogen, etc. and at atmospheric, subatmospheric or superatmospheric pressures for between 30 minutes and 48 hours. Dehydration can also be performed at room temperature merely by placing the composition in a vacuum, but a longer time is required to obtain a sufficient amount of dehydration.

The crystalline material can be prepared generally by the following method:

(1) Combine the primary organic directing agent (R'), hereinafter more particularly described, optional additional organic directing agent (R"), hereinafter more particularly described, optional source of alkali or alkaline earth metal (M), e.g., sodium or potassium, cations, and a solvent or solvent mixture, such as, for example, $C_1$-$C_6$ alcohols, $C_1$-$C_6$ diols and/or water, especially water, such that the mole ratio $$Solvent/(R'_2O+M_2O)$$

is from about 45 to less than about 100, preferably from about 45 to about 92. When this ratio is between about 92 to 100 in this general method, impurity products form mixtures with the desired crystalline material.

(2) Add one or a combination of oxides of tetravalent element Y, e.g., silicon, and optionally one or a combination of oxides of elements selected from the group consisting of divalent element W, e.g., cobalt, trivalent element X, e.g., aluminum and pentavalent element Z, e.g., phosphorus, to the mixture of step (1), such that the mole ratio $$R_2O/(YO_2+X_2O_3+Z_2O_5+WO)$$

is in the range of from about 0.3 to about 1, preferably from about 0.3 to about 0.6, where R is the total organic directing agent, i.e., R'+R".

(3) Agitate the mixture resulting from step (2) for from about 10 minutes to about 6 hours, preferably from about 30 minutes to about 2 hours, at a temperature of from about 0° C. to about 50° C., and a pH of from about 7 to about 14.

(4) Crystallize the product from step (3) at a temperature of from about 50° C. to about 200° C., preferably from about 95° C. to about 150° C., for from about 4 to 72 hours, preferably from 16 to about 60 hours.

Batch crystallization can be carried out under either static or agitated, e.g., stirred, conditions in a suitable reactor vessel, such as for example, polypropylene jars or teflon lined or stainless steel autoclaves. Crystallization may also be conducted continuously in suitable equipment. Following crystallization, the crystalline product is separated from the liquid and recovered.

By this general procedure, when a source of silicon is used, it may be, at least in part, an organic silicate, such as, for example, a quaternary ammonium silicate. Non-limiting examples of such a silicate include tetramethylammonium silicate and tetraethylorthosilicate.

The improvement of the present invention requires that (i) there must be a silicon source and (ii) the source of silicon be a colloidal dispersion of $SiO_2$, or a precipitated, hydrated $SiO_2$ Colloidal dispersions of silica include, for example, Ludox LS and Ludox HS formulations. A typical formulation is a colloidal dispersion of about 30 wt. % $SiO_2$. Precipitated $SiO_2$ formulations include, for example, Hi—Sil, having an ultimate particle size of about 0.02 micron.

The improvement of the present invention also requires the addition of ethanol to the reaction mixture prior to crystallization step (4). The amount of ethanol to be added is from about 1 to about 50 moles/mole of silica, preferably from about 1 to about 15 moles/mole of silica.

The present improved method allows for the Solvent/($R'_2O + M_2O$) mole ratio of step (1) to extend from about 45 to less than about 110, preferably from about 45 to about 100, while avoiding impurity product mixtures which form in the general synthesis method when this ratio is between about 92 and 100 in step (1).

By adjusting conditions of the synthesis reaction like temperature, pH and time of reaction, etc., within the above limits, embodiments of the non-layered crystalline material with a desired average pore size may be prepared. In particular, changing the pH, the temperature or the reaction time may promote formation of product crystals with different average pore size.

Non-limiting examples of various combinations of W, X, Y and Z contemplated for the procedure of the present invention include:

| W  | X  | Y  | Z |
|----|----|----|---|
| —  | Al | Si | — |
| —  | Al | Si | P |
| Co | Al | Si | P |
| —  | —  | Si | — | including the combinations of W being Mg, or an element selected from the divalent first row transition metals, e.g., Mn, Co and Fe; X being B, Ga or Fe; and Y including Ge and/or Ti along with Si.

The primary organic directing agent, R', for use in the above method is an ammonium or phosphonium ion of the formula $R_1R_2R_3R_4Q^+$, i.e.,

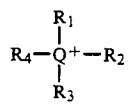

wherein Q is nitrogen or phosphorus and wherein at least one of $R_1$, $R_2$, $R_3$ and $R_4$ is aryl or alkyl of from 8 to about 36 carbon atoms, e.g., $-C_{10}H_{21}$, $-C_{16}H_{33}$, and $-C_{18}H_{37}$, or combinations thereof, the remainder of $R_1$, $R_2$, $R_3$ and $R_4$ being selected from the group consisting of hydrogen, alkyl of from 1 to 7 carbon atoms and combinations thereof. The compound from which the above ammonium or phosphonium ion is derived may be, for example, the hydroxide, halide, silicate, or mixtures thereof.

If an additional organic directing agent, R'', is used in the above method, it is the ammonium or phosphonium ion of the above directing agent formula wherein $R_1$, $R_2$, $R_3$ and $R_4$ together or separately are selected from the group consisting of hydrogen and alkyl of 1 to 7 carbon atoms and combinations thereof. Any such combination of organic directing agents go to make up "R" and will be in molar ratio of about 100/1 to about 0.01/1, first above listed primary organic directing agent/additional organic directing agent, i.e., R'/R''.

The particular effectiveness of the presently required directing agent, when compared with other such agents known to direct synthesis of one or more other crystal structures, is believed due to its ability to function as a template in the above reaction mixture in the nucleation and growth of the desired ultra-large pore crystals with the limitations discussed above. Non-limiting examples of these directing agents include cetyltrimethylammonium, cetyltrimethylphosphonium, octadecyltrimethylphosphonium, cetylpyridinium, myristyltrimethylammonium, decyltrimethylammonium, dodecyltrimethylammonium and dimethyldidodecylammonium.

It should be realized that the reaction mixture components can be supplied by more than one source. The reaction mixture can be prepared either batchwise or continuously. Crystal size and crystallization time of the new crystalline material will vary with the nature of the reaction mixture employed and the crystallization conditions.

The crystals prepared by the instant invention can be shaped into a wide variety of particle sizes. Generally speaking, the particles can be in the form of a powder, a granule, or a molded product, such as an extrudate having particle size sufficient to pass through a 2 mesh (Tyler) screen and be retained on a 400 mesh (Tyler) screen. In cases where the catalyst is molded, such as by extrusion, the crystals can be extruded before drying or partially dried and then extruded.

The product compositions are useful as catalyst components for catalyzing the conversion of organic compounds, e.g., oxygenates and hydrocarbons, by acid-catalyzed reactions. The size of the pores is also such that the spatiospecific selectivity with respect to transition state species is minimized in reactions such as cracking (Chen et al., "Shape Selective Catalysis in Industrial Applications", 36 Chemical Industries, pgs. 41–61 (1989)) to which reference is made for a discussion of the factors affecting shape selectivity). Diffusional limitations are also minimized as a result of the very large pores in the present product materials. For these reasons, the present product compositions are especially useful for catalyzing reactions which occur in the presence of acidic sites on the surface of the catalyst and which involve reactants, products or transitional state species which have large molecular sizes, too great for undergoing similar reactions with conventional large pore size solid catalysts, for example, large pore size zeolites such as zeolite X, Y, L, ZSM-4, ZSM-18, and ZSM-20.

Thus, the present product catalytic compositions will catalyze reactions such as cracking, and hydrocracking, and other conversion reactions using hydrocarbon feeds of varying molecular sizes, but with particular applicability to feeds with large molecular sizes such as highly aromatic hydrocarbons with substituted or unsubstituted polycyclic aromatic components, bulky naphthenic compounds or highly substituted compounds with bulky steric configurations, e.g., molecular sizes of about 13 Angstroms or more. The present catalytic compositions are particularly useful for reactions in which the molecular weight of the feed is reduced to a lower value, i.e., to reactions involving cracking such as cracking or hydrocracking. Cracking may be conducted at a temperature of from about 200° C. to about 800° C., a pressure of from about atmospheric to about 100 psig and contact time of from about 0.1 second to about 60 minutes. Hydrocracking may be conducted at a temperature of from about 150° C. to about 550° C., a pressure of from about 100 psig to about 3000 psig, and a weight hourly space velocity of from about 0.1 hr$^{-1}$ to about 100 hr$^{-1}$, with a hydrogen/hydrocarbon molar ratio of from about 0.1 to about 100.

The catalytic compositions prepared according to the present invention may also be used for selective conversion of inorganic compounds such as oxides of nitrogen in mixtures of gases which contain nitrogen oxides ($NO_x$), for example, industrial exhaust gases and the gases formed during the oxidative regeneration of catalysts used in the processing of hydrocarbons, especially in catalytic cracking operations. The porous crystalline material may be used in a matrixed or unmatrixed form for this purpose and may suitably be formed into extrudates, pellets or other shapes to permit the passage of gases over the catalyst with the minimum pressure drop. The crystalline material is preferably at least partly in the hydrogen form, but it may advantageously contain a minor amount of a noble metal as a catalytic component, especially a metal of Periods 5 and 6 of Group VIIIA of the Periodic Table, especially platinum, palladium, ruthenium, rhodium, iridium or mixtures thereof. Amounts of noble metal up to about 1 weight percent are typical with lower amounts, e.g., up to about 0.1 or 0.5 weight percent being preferred.

The $NO_x$ reduction is suitably conducted by passing the gas containing the oxides of nitrogen over the catalyst at an elevated temperature, typically at least 200° C., and usually within the range of 200° to 600° C. The gas mixture may be mixed with ammonia to promote reduction of the oxides of nitrogen and pre-mixing may be conducted at a temperature of up to about 200° C. The amount of ammonia which is mixed with the gas mixture is typically within the range of 0.75 to 1.25 the stoichiometric amount, which itself varies according to the ratio of the different oxides of nitrogen in the gas mixture, as shown by the equations:

$$6NO_2 + 8NH_3 = 7N_2 + 12H_2O$$

$$6NO + 4NH_3 = 5N_2 + 6H_2O$$

The crystalline catalytic compositions may also be used for the reduction of oxides of nitrogen in gaseous mixtures in the presence of other reducing agents such as carbon or carbon monoxide. Reduction of the oxides of nitrogen in this way is of particular utility in the regeneration of fluid catalytic cracking (FCC) catalysts, since regeneration under appropriate conditions will produce the required concentrations of carbon monoxide which may then be used to reduce the proportion of $NO_x$ in the regeneration gases in the presence of the catalyst.

Because the present catalytic compositions have been found to be stable, their use as cracking catalysts, e.g., in fluid catalytic cracking processes, with resid feeds will represent an especially favorable mode of utilization. Still further, they may be used in combination with one or more other catalyst components such as, for example, cracking catalysts comprising silica-alumina and/or zeolite Y, e.g., USY.

The present catalytic compositions are especially useful for reactions using high molecular weight, high boiling or non-distillable feeds, especially residual feeds, i.e., feeds which are essentially non-distillable or feeds which have an initial boiling point (5% point) above about 1050° F. Residual feeds which may be used with the present catalytic compositions include feeds with API gravities below about 20, usually below 15 and typically from 5 to 10 with Conradsen Carbon Contents (CCR) of at least 1% by weight and more usually at least 5% or more, e.g., 5–10%. In some resid fractions the CCR may be as high as about 20 weight percent or even higher. The aromatic contents of these feeds will be correspondingly high, as may the contents of hetero- atoms such as sulfur and nitrogen, as well as metals. Aromatics content of these feeds will usually be at least 50 weight percent and typically much higher, usually at least 70 or 80 weight percent, with the balance being principally naphthenes and heterocyclics. Typical petroleum refinery feeds of this type include atmospheric and vacuum tower resids, asphalts, aromatic extracts from solvent extraction processes, e.g., phenol or furfural extraction, deasphalted oils, slop oils and residual fractions from various processes such as lube production, coking and the like. High boiling fractions with which the present catalytic compositions may be used include gas oils, such as atmospheric gas oils; vacuum gas oils; cycle oils, especially heavy cycle oil; deasphalted oils; solvent extracts, such as bright stock; heavy gas oils, such as coker heavy gas oils; and the like. The present catalytic materials may also be utilized with feeds of non-petroleum origin, for example, synthetic oils produced by coal liquefaction, Fischer-Tropsch waxes and heavy fractions and other similar materials.

The product of this invention can also be used as adsorbents and separation vehicles in pharmaceutical and fine chemical applications. For example, porous compositions may be used in the purification of drugs like insulin or be used as solid vehicles for the controlled delivery of drugs. Another application for use of these porous materials involves waste disposal where the extraordinary pore volumes are exploited. Therefore, at least one component can be partially or substantially totally separated from a mixture of components having differential sorption characteristics with respect to the present porous composition by contacting the mixture with the composition to selectively sorb the one component. Examples of this include contacting a mixture comprising water and at least one hydrocarbon component, whereby the at least one hydrocarbon component is selectively sorbed. Another example includes selective sorption of at least one hydrocarbon component from a mixture comprising same and at least one additional hydrocarbon component.

As in the case of many catalysts, it may be desired to incorporate the new crystal composition with another material resistant to the temperatures and other conditions employed in organic conversion processes. Such materials include active and inactive materials and synthetic or naturally occurring zeolites as well as inorganic materials such as clays, silica and/or metal oxides such as alumina, titania and/or zirconia. The latter may be either naturally occurring or in the form of gelatinous precipitates or gels including mixtures of silica and metal oxides. Use of a material in conjunction with the new crystal, i.e., combined therewith or present during synthesis of the new crystal, which is active, tends to change the conversion and/or selectivity of the catalyst in certain organic conversion processes. Inactive materials suitably serve as diluents to control the amount of conversion in a given process so that products can be obtained economically and orderly without employing other means for controlling the rate of reaction. These materials may be incorporated with naturally occurring clays, e.g., bentonite and kaolin, to improve the crush strength of the catalyst under commercial operating conditions. Said materials, i.e., clays, oxides, etc., function as binders for the catalyst. It is desirable to provide a catalyst having good crush strength because in commercial use it is desirable to prevent the catalyst from breaking down into powder-like materials. These clay binders have been employed normally only for the purpose of improving the crush strength of the catalyst.

Naturally occurring clays which can be composited with the new crystal include the montmorillonite and kaolin family, which families include the subbentonites, and the kaolins commonly known as Dixie, McNamee, Georgia and Florida clays or others in which the main mineral constituent is halloysite, kaolinite, dickite, nacrite, or anauxite. Such clays can be used in the raw state as originally mined or initially subjected to calcination, acid treatment or chemical modification.

In addition to the foregoing materials, the new crystal can be composited with a porous matrix material such as silica-alumina, silica-magnesia, silica-zirconia, silica-thoria, silica-beryllia, silica-titania as well as ternary compositions such as silica-alumina-thoria, silica-alumina-zirconia, silica-alumina-magnesia and silica-magnesia-zirconia.

It may be desirable to provide at least a part of the foregoing matrix materials in colloidal form so as to facilitate extrusion of the bound catalyst components(s).

The relative proportions of finely divided crystalline material and inorganic oxide matrix vary widely, with the crystal content ranging from about 1 to about 90 percent by weight and more usually, particularly when the composite is prepared in the form of beads, in the range of about 2 to about 80 weight percent of the composite.

In order to more fully illustrate the nature of the invention and the manner of practicing same, the following examples are presented. Examples 1-5, taken from U.S. patent application Ser. No. 07/734,825, incorporated herein by reference, demonstrate the general method for synthesis which is improved by the present invention, demonstrated by Example 6.

In the examples, whenever sorption data are set forth for comparison of sorptive capacities for water, cyclohexane, benzene and/or n-hexane, they are Equilibrium Adsorption values determined as follows:

A weighed sample of the adsorbent, after calcination at about 540° C. for at least about 1 hour and other treatment, if necessary, to remove any pore blocking contaminants, is contacted with the desired pure adsorbate vapor in an adsorption chamber. The increase in weight of the adsorbent is calculated as the adsorption capacity of the sample in terms of grams/100 grams adsorbent based on adsorbent weight after calcination at about 540° C. The present composition usually exhibits an equilibrium benzene adsorption capacity at 50 Torr and 25° C. of greater than about 10 grams/100 grams, particularly greater than about 17.5 g/100 g, and more particularly greater than about 20 g/100 g.

A preferred way to do this is to contact the desired pure adsorbate vapor in an adsorption chamber evacuated to less than 1 mm at conditions of 12 Torr of water vapor, 40 Torr of n-hexane or cyclohexane vapor, or 50 or 60 Torr of benzene vapor, at 25° C. The pressure is kept constant (within about ±0.5 mm) by addition of adsorbate vapor controlled by a manostat during the adsorption period. As adsorbate is adsorbed by the new crystal, the decrease in pressure causes the manostat to open a valve which admits more adsorbate vapor to the chamber to restore the above control pressures. Sorption is complete when the pressure change is not sufficient to activate the manostat.

Another way of doing this for benzene adsorption data is on a suitable thermogravimetric analysis system, such as a computer-controlled 990/951 duPont TGA system. The adsorbent sample is dehydrated (physically sorbed water removed) by heating at, for example, about 350° C. or 500° C. to constant weight in flowing helium. If the sample is in as-synthesized form, e.g., containing organic directing agents, it is calcined at about 540° C. in air and held to constant weight instead of the previously described 350° C. or 500° C. treatment. Benzene adsorption isotherms are measured at 25° C. by blending a benzene saturated helium gas stream with a pure helium gas stream in the proper proportions to obtain the desired benzene partial pressure. The value of the adsorption at 50 Torr or 60 Torr of benzene is taken from a plot of the adsorption isotherm.

In the examples, percentages are by weight unless otherwise indicated.

EXAMPLE 1

One hundred grams of cetyltrimethylammonium (CTMA) hydroxide solution (prepared by contacting a 29 wt. % N,N,N-trimethyl-1-hexadecanaminium chloride solution with a hydroxide-for-halide exchange resin) was combined with 17.5 grams of tetraethylorthosilicate (TEOS) with stirring. The stirring was continued for one hour. This mixture was placed in a polypropylene bottle and put into a steam box (~100° C.) for 48 hours. The mixture had a composition in terms of moles per mole $SiO_2$ assuming complete exchange of the surfactant:

0.57 moles of $(CTMA)_2O$
47 moles of $H_2O$

The mixture ratio of Solvent/$(R'_2O + M_2O)$ was 82.

The resultant product was filtered, washed, air-dried and calcined (1 hour at 540° C. in flowing nitrogen followed by 6 hours in air). A tabulation of the X-ray diffraction peak positions obtained by deconvolution of the X-ray diffraction pattern for this preparation follows:

| Interplanar d-Spacing | Relative Intensity | $d_n/d_1$ |
| --- | --- | --- |
| 32.6 | 100.0 | 1.00 |
| 28.2 | 17.4 | 0.87 |
| 21.4 | 1.7 | 0.66 |
| 20.0 | 1.3 | 0.61 |
| 17.9 | 5.1 | 0.55 |
| 17.1 | 7.1 | 0.52 |
| 16.2 | 1.9 | 0.50 |
| 15.7 | 1.4 | 0.48 |

The benzene sorption capacity of the product material was measured to be approximately 55 wt. %.

EXAMPLE 2

One hundred grams of cetyltrimethylammonium (CTMA) hydroxide solution prepared as in Example 1 was combined with 20 grams of tetraethylorthosilicate (TEOS) with stirring at approximately 4° C. The stirring was continued for one hour. This mixture was placed in a polypropylene bottle and put into a steam box (~100° C.) for 48 hours. The mixture had a composition in terms of moles per mole $SiO_2$ assuming complete exchange of the surfactant:

0.59 moles of $(CTMA)_2O$
41 moles of $H_2O$

The mixture ratio of Solvent/$(R'_2O + M_2O)$ was 69.

The resultant product was filtered, washed, air-dried and calcined (1 hour at 540° C. in flowing nitrogen followed by 6 hours in air). A tabulation of the X-ray diffraction peak positions obtained by deconvolution of the X-ray diffraction pattern for this preparation follows:

| Interplanar d-Spacing | Relative Intensity | $d_n/d_1$ |
| --- | --- | --- |
| 33.1 | 100.0 | 1.00 |
| 28.6 | 12.3 | 0.86 |
| 21.7 | 1.2 | 0.66 |
| 20.3 | 1.1 | 0.61 |
| 18.1 | 3.8 | 0.55 |
| 17.3 | 6.0 | 0.52 |
| 16.5 | 2.3 | 0.50 |
| 15.9 | 1.6 | 0.48 |

The benzene sorption capacity of the product material was measured to be approximately 12.1 wt. %.

EXAMPLE 3

One hundred grams of cetyltrimethylammonium (CTMA) hydroxide solution prepared as in Example 1 was combined with 17.5 grams of tetraethylorthosilicate (TEOS) and 2.75 grams of titanium ethoxide with stirring. The stirring was continued for one hour. This mixture was placed in a polypropylene bottle and put into a steam box (~100° C.) for 7 days. The mixture had a composition in terms of moles per mole $SiO_2$ assuming complete exchange of the surfactant:

0.57 moles of $(CTMA)_2O$
47 moles of $H_2O$
0.14 moles of $TiO_2$
0.48 moles $(CTMA)_2O$/mole $(SiO_2+TiO_2)$ The mixture ratio of Solvent/$(R'_2O+M_2O)$ was 82.

The resultant product was filtered, washed, air-dried and calcined (1 hour at 540° C. in flowing nitrogen followed by 6 hours in air). A tabulation of the X-ray diffraction peak positions obtained by deconvolution of the X-ray diffraction pattern for this preparation follows:

| Interplanar d-Spacing | Relative Intensity | $d_n/d_1$ |
| --- | --- | --- |
| 33.6 | 100.0 | 1.00 |
| 29.0 | 15.8 | 0.86 |
| 21.8 | 1.4 | 0.65 |
| 20.5 | 1.8 | 0.61 |
| 18.3 | 4.8 | 0.54 |
| 17.5 | 6.4 | 0.52 |
| 16.7 | 2.2 | 0.50 |
| 16.1 | 1.1 | 0.48 |

The benzene sorption capacity of the product material was measured to be approximately 32 wt. %.

The elemental analyses of the products of Examples 1, 2 and 3 are included in the following tabulation:

| | ELEMENTAL ANALYSES, WT. % | | | | | |
| --- | --- | --- | --- | --- | --- | --- |
| Example | C | N | Ti | Al | Si | Ash, 1000° C. |
| 1 | 33.44 | 1.88 | — | 0.039 | 11.73 | 25.89 |
| 2 | 40.43 | 2.33 | — | 0.075 | 16.86 | 37.13 |
| 3 | 35.38 | 2.08 | 2.18 | — | 14.56 | 32.35 |

EXAMPLE 4

One hundred grams of cetyltrimethylammonium (CTMA) hydroxide solution prepared as in Example 1 was combined with 30 grams of tetraethylorthosilicate (TEOS) with stirring. The stirring was continued for one hour. An 11.2 gram quantity of 1N NaOH solution was then added. This mixture was placed in a polypropylene bottle and put into a steam box ~100° C.) for 48 hours. The mixture had a composition in terms of moles per mole $SiO_2$ assuming complete exchange of the surfactant:

0.33 moles of $(CTMA)_2O$
0.025 moles of $Na_2O$
32 moles of $H_2O$

The mixture ratio of Solvent/$(R'_2O+M_2O)$ was 90.

The resultant product was filtered, washed, air-dried and calcined (1 hour at 540° C. in flowing nitrogen followed by 6 hours in air). The benzene sorption capacity of the product material was measured to be approximately 37 wt. %. A tabulation of the X-ray diffraction peak positions obtained by deconvolution of the X-ray diffraction pattern for this preparation follows:

| Interplanar d-Spacing | Relative Intensity | $d_n/d_1$ |
| --- | --- | --- |
| 32.3 | 100.0 | 1.00 |
| 28.2 | 16 | 0.87 |
| 21.3 | 1 | 0.66 |
| 20.1 | 1 | 0.62 |
| 17.7 | 13 | 0.55 |
| 17.0 | 8 | 0.53 |
| 16.5 | 3 | 0.51 |
| 16.0 | 7 | 0.50 |

EXAMPLE 5

One hundred grams of cetyltrimethylammonium (CTMA) hydroxide solution prepared as in Example 1 was combined with 30 grams of tetraethylorthosilicate (TEOS) with stirring. The stirring was continued for one hour. A 2.3 gram quantity of a 25 wt. % aqueous solution of tetramethylammonium hydroxide was then added. This mixture was placed in a polypropylene bottle and put into a steam box (~100° C.) for 48 hours. The mixture had a composition in terms of moles per mole $SiO_2$ assuming complete exchange of the surfactant:

0.33 moles of $(CTMA)_2O$
0.025 moles of $(TMA)_2O$
28 moles of $H_2O$

The mixture ratio of Solvent/$(R'_2O+M_2O)$ was 85.

The resultant product was filtered, washed, air-dried and calcined (1 hour at 540° C. in flowing nitrogen followed by 6 hours in air). The benzene sorption capacity of the product material was measured to be approximately 35 wt. %. A tabulation of the X-ray diffraction peak positions obtained by deconvolution of the X-ray diffraction pattern for this preparation follows:

| Interplanar d-Spacing | Relative Intensity | $d_n/d_1$ |
| --- | --- | --- |
| 31.2 | 100.0 | 1.00 |
| 27.2 | 8 | 0.87 |
| 16.7 | 5 | 0.54 |

EXAMPLE 6

Thirty-five grams of Ludox HS-40, a colloidal dispersion of wt. % $SiO_2$ having an $SiO_2/Na_2O$ mole ratio of 100, was added to 300 grams of cetyltrimethylammonium (CTMA) hydroxide solution prepared as in Example 1. After stirring for 0.5 hour, 20 grams of ethanol was added to the mixture. The mixture was then placed in an autoclave and maintained at 120° C. with stirring for 24 hours. The mixture had a composition in terms of moles per mole SiO$_2$ assuming complete exchange of the surfactant:

0 58 moles of (CTMA)$_2$O
0.01 moles of Na$_2$O
55.8 moles of H$_2$O
8.03 moles of ethanol The mixture had a Solvent/(R'$_2$O+M$_2$O) ratio of 108.

The resultant product was filtered, washed, air-dried at 100° C. and calcined (6 hours at 540° C. in air). A tabulation of the X-ray diffraction peak positions obtained by deconvolution of the X-ray diffraction pattern for this high purity preparation follows:

| Interplanar d-Spacing | Relative Intensity | $d_n/d_1$ |
|---|---|---|
| 34.9 | 100 | 1.00 |
| 30.5 | 11 | 0.87 |
| 22.6 | 0.5 | 0.64 |
| 20.9 | 0.5 | 0.60 |
| 18.8 | 5.0 | 0.54 |
| 17.9 | 2.8 | 0.51 |
| 17.2 | 2.6 | 0.50 |

The benzene sorption capacity of the product material was measured to be approximately 62 wt. %. The product had a BET of about 1600 m$^2$/g.

EXAMPLE 7

Fourteen and seven-tenths grams of HiSil 233, a precipitated SiO$_2$ which contains approximately 0.55 wt. % Al$_2$O$_3$, were added to 300 grams of cetyltrimethylammonium (CTMA) hydroxide solution prepared as in Example 1. After stirring for 0.5 hour, 36 grams of solid cetyltrimethylammonium bromide were added to the mixture. After additional stirring for 0.25 hour, 20 grams of ethanol were added to the mixture. The mixture was then placed in an autoclave and maintained at 120° C. with stirring for 24 hours. The mixture had a composition in terms of moles per SiO$_2$ assuming complete exchange of the surfactant:

| 0.003 | moles of Al$_2$O$_3$ |
|---|---|
| 0.79 | moles of (CTMA)$_2$O |
| 50.77 | moles of H$_2$O |
| 8.03 | moles of C$_2$H$_5$OH |

The mixture had a Solvent/(R'$_2$O+M$_2$O) ratio of 74.

The resultant product was filtered, washed, air-dried at 100° C., and calcined (6 hours at 540° C. in air). A tabulation of the X-ray diffraction peak positions obtained by deconvolution of X-ray diffraction pattern for this preparation follows:

| Interplanar d-Spacing | Relative Intensity | $d_n/d_1$ |
|---|---|---|
| 35.5 | 100 | 1.00 |
| 31.5 | 28 | 0.88 |
| 23.2 | 1 | 0.65 |
| 21.7 | 1 | 0.61 |
| 19.4 | 10 | 0.55 |
| 18.5 | 8 | 0.52 |
| 17.7 | 5 | 0.50 |
| 17.0 | 2 | 0.48 |

The benzene sorption capacity of the product material was measured to be approximately 68 wt. %. The product had a BET surface area of 966 m$^2$/g.

EXAMPLE 8(A)

Argon Physisorption For Pore Systems Up to About 60 Angstroms Diameter

To determine the pore diameters of the products of this invention with pores up to about 60 Angstroms in diameter, 0.2 gram samples of the products of Examples 1 through 6 were placed in glass sample tubes and attached to a physisorption apparatus as described in U.S. Pat. No. 4,762,010, which is incorporated herein by reference.

The samples were heated to 300° C. for 3 hours in vacuo to remove adsorbed water. Thereafter, the samples were cooled to 87° K. by immersion of the sample tubes in liquid argon. Metered amounts of gaseous argon were then admitted to the samples in stepwise manner as described in U.S. Pat. No. 4,762,010, column 20. From the amount of argon admitted to the samples and the amount of argon left in the gas space above the samples, the amount of argon adsorbed can be calculated. For this calculation, the ideal gas law and the calibrated sample volumes were used. (See also S. J. Gregg et al., Adsorption, Surface Area and Porosity, 2nd ed. (1982)). In each instance, a graph of the amount adsorbed versus the relative pressure above the sample, at equilibrium, constitutes the adsorption isotherm. It is common to use relative pressures which are obtained by forming the ratio of the equilibrium pressure and the vapor pressure P$_o$ of the adsorbate at the temperature where the isotherm is measured. Sufficiently small amounts of argon were admitted in each step to generate 168 data points in the relative pressure range from 0 to 0.6. At least about 100 points are required to define the isotherm with sufficient detail.

The step (inflection) in the isotherm indicates filling of a pore system. The size of the step indicates the amount adsorbed, whereas the position of the step in terms of P/P$_o$ reflects the size of the pores in which the adsorption takes place. Larger pores are filled at higher P/P$_o$. In order to better locate the position of the step in the isotherm, the derivative with respect to log (P/P$_o$) is formed. This conversion was obtained by using the following formula:

$$\log(P/P_o) = \frac{K}{d - 0.38}\left(\frac{S^4}{3(L - D/2)^3} - \frac{S^{10}}{9(L - D/2)^9} - \frac{S^4}{3(D/2)^3} + \frac{S^{10}}{9(D/2)^9}\right)$$

wherein d=pore diameter in nanometers, K=32.17, S=0.2446, L=d+0.19, and D=0.57.

This formula is derived from the method of Horvath and Kawazoe (G. Horvath et al., J. Chem. Eng. Japan, 16 (6), 470 (1983)). The constants required for the implementation of this formula were determined from a measured isotherm of AlPO$_4$—5 and its known pore size. This method is particularly useful for microporous materials having pores of up to about 60 Angstroms in diameter.

The results of this procedure for the samples from Examples 1 through 6 are tabulated below.

| Example | Pore Diameter, Angstroms |
|---|---|
| 1 | 28 |

-continued

| Example | Pore Diameter, Angstroms |
| --- | --- |
| 2 | 29 |
| 3 | 30 |
| 4 | 29 |
| 5 | 27 |
| 6 | 31 |

EXAMPLE 8(B)

Argon Physisorption For Pore Systems Over About 60 Angstroms Diameter

The above method of Horvath and Kawazoe for determining pore size from physisorption isotherms was intended to be applied to pore systems of up to 20 Angstroms diameter; but with some care as above detailed, its use can be extended to pores of up to 60 Angstroms diameter.

In the pore regime above 60 Angstroms diameter, however, the Kelvin equation can be applied. It is usually given as:

$$\ln(P/P_o) = \frac{-2\lambda V}{r_k RT} \cos\theta$$

where:
- $\lambda$ = surface tension of sorbate
- V = molar volume of sorbate
- $\Theta$ = contact angle (usually taken for practical reasons to be 0)
- R = gas constant
- T = absolute temperature
- $r_k$ = capillary condensate (pore) radius
- $P/P_o$ = relative pressure (taken from the physisorption isotherm)

The Kelvin equation treats adsorption in pore systems as a capillary condensation phenomenon and relates the pressure at which adsorption takes place to the pore diameter through the surface tension and contact angle of the adsorbate (in this case, argon). The principles upon which the Kelvin equation are based are valid for pores in the size range 50 to 1000 Angstrom diameter. Below this range the equation no longer reflects physical reality, since true capillary condensation cannot occur in smaller pores; above this range the logarithmic nature of the equation precludes obtaining sufficient accuracy for pore size determination.

The particular implementation of the Kelvin equation often chosen for measurement of pore size is that reported by Dollimore and Heal (D. Dollimore and G. R. Heal, *J. Applied Chem*, 14, 108 (1964)). This method corrects for the effects of the surface layer of adsorbate on the pore wall, of which the Kelvin equation proper does not take account, and thus provides a more accurate measurement of pore diameter. While the method of Dollimore and Heal was derived for use on desorption isotherms, it can be applied equally well to adsorption isotherms by simply inverting the data set.

What is claimed is:

1. In a method for synthesizing a composition of matter comprising an inorganic, porous crystalline phase material having, after calcination, an X-ray diffraction pattern including values substantially as shown in Table 1 which comprises the steps of
   (1) combining a primary organic directing agent (R'), optional additional organic directing agent (R"), optional source of alkali or alkaline earth metal (M) ions, and a solvent or solvent mixture such that the mole ratio Solvent/(R'$_2$O + M$_2$O)

is from about 45 to less than about 100,
   (2) adding one or a combination of oxides of tetravalent element Y, and optionally one or a combination of oxides of elements selected from the group consisting of divalent element W, trivalent element X and pentavalent element Z to the mixture of step (1), such that the mole ratio

R$_2$O/(YO$_2$ + X$_2$O$_3$ + Z$_2$O$_5$ + WO)

is from about 0.3 to about 1, where R is the total of R' + R",
   (3) agitating the mixture resulting from step (2) at a temperature of from about 0° C. to about 50° C. and a pH of from about 7 to about 14, and
   (4) crystallizing the product from step (3) at a temperature of from about 50° C. to about 200° C., the improvement wherein Y comprises silicon and the oxide of Y is added as a colloidal dispersion of SiO$_2$ or a precipitated SiO$_2$, ethanol is added to the mixture prior to crystallizing step (4), and wherein the Solvent/(R'$_2$O + M$_2$O) mole ratio of step (1) is from about 45 to less than about 110.

2. The method of claim 1 wherein the mole ratio R$_2$O/(YO$_2$ + X$_2$O$_3$ + Z$_2$O$_5$ + WO) is from about 0.3 to about 0.6.

3. The method of claim 1 wherein R' comprises an ion of the formula R$_1$R$_2$R$_3$R$_4$Q$^+$, wherein Q is nitrogen or phosphorus and wherein at least one of R$_1$, R$_2$, R$_3$ and R$_4$ is aryl or alkyl of from 8 to about 36 carbon atoms or combinations thereof, the remainder of R$_1$, R$_2$, R$_3$ and R$_4$ being selected from the group consisting of hydrogen, alkyl of from 1 to 7 carbon atoms and combinations thereof.

4. The method of claim 1 wherein R" comprises an ion of the formula R$_1$R$_2$R$_3$R$_4$Q$^+$, wherein Q is nitrogen or phosphorus and wherein at least one of R$_1$, R$_2$, R$_3$ and R$_4$ are selected from the group consisting of hydrogen, alkyl of 1 to 7 carbon atoms and combinations thereof.

5. The method of claim 1 wherein R' is cetyltrimethylammonium, octadecyltrimethylammonium, cetylpyridinium, myristyltrimethylammonium, decyltrimethylammonium, dodecyltrimethylammonium or dimethyldidodecylammonium.

6. The method of claim 5 wherein R' is cetyltrimethylammonium or octadecyltrimethylammonium.

7. The method of claim 1 wherein said solvent is C$_1$–C$_6$ alcohol, C$_1$–C$_6$ diol, water or mixture thereof.

8. The method of claim 1 wherein said porous crystalline phase material has, after calcination, an X-ray diffraction pattern including values substantially as shown in Table 2 of the specification.

9. The method of claim 1 wherein said porous crystalline phase material has, after calcination, an X-ray diffraction pattern including values substantially as shown in Table 3 of the specification.

10. The method of claim 1 wherein said porous crystalline phase material has, after calcination, an X-ray diffraction pattern including values substantially as shown in Table 4 of the specification.

11. The method of claim 1 wherein said porous crystalline phase material has, after calcination, an X-ray diffraction pattern including values substantially as shown in Table 5 of the specification.

12. The method of claim 1 wherein said porous crystalline phase material has, after calcination, an X-ray diffraction pattern including values substantially as shown in Table 6 of the specification.

13. The method of claim 1 wherein said crystalline phase has a composition expressed as follows:

$$M_{n/q}(W_aX_bY_cZ_dO_h)$$

wherein M is one or more ions; n is the charge of the composition excluding M expressed as oxides; q is the weighted molar average valence of M; n/q is the number of moles or mole fraction of M; W is one or more divalent elements; X is one or more trivalent elements; Y comprises silicon; Z is one or more pentavalent elements; a,b,c, and d are mole fractions of W,X,Y and Z, respectively; h is a number of from 1 to 2.5; and $(a+b+c+d)=1$.

14. The method of claim 13 wherein the sum $(a+b+c)$ is greater than d, and $h=2$.

15. The method of claim 13 wherein W is a divalent first row transition metal or magnesium; X is aluminum, boron, gallium or iron; and Z is phosphorus.

16. The method of claim 13 wherein W comprises cobalt, X comprises aluminum, and Z comprises phosphorus.

17. The method of claim 14 wherein W is a divalent first row transition metal or magnesium; X is aluminum, boron, gallium or iron; and Z is phosphorus.

18. The method of claim 14 wherein W comprises cobalt, X comprises aluminum, and Z comprises phosphorus.

19. The method of claim 13 wherein a and d are 0 and $h=2$.

20. The method of claim 19 wherein X comprises aluminum, boron, gallium or iron.

21. The method of claim 1 wherein said crystalline phase has a regular arrangement of uniformly sized pores of at least about 13 Angstrom Units as measured by argon physisorption.

* * * * *